US008209682B2

(12) United States Patent
Cherkasova et al.

(10) Patent No.: US 8,209,682 B2
(45) Date of Patent: Jun. 26, 2012

(54) SYSTEM AND METHOD FOR CONTROLLING AGGREGATE CPU USAGE BY VIRTUAL MACHINES AND DRIVER DOMAINS OVER A PLURALITY OF SCHEDULING INTERVALS

(75) Inventors: Ludmila Cherkasova, Sunnyvale, CA (US); Diwaker Gupta, San Diego, CA (US); Robert D. Gardner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1735 days.

(21) Appl. No.: 11/493,250

(22) Filed: Jul. 26, 2006

(65) Prior Publication Data

US 2008/0028411 A1    Jan. 31, 2008

(51) Int. Cl.
  G06F 9/455 (2006.01)
  G06F 9/46 (2006.01)
(52) U.S. Cl. ............................................ 718/1; 718/104
(58) Field of Classification Search ............... 718/1, 104; 719/321
  See application file for complete search history.

(56) References Cited

U.S. PATENT DOCUMENTS

| 6,223,201 B1 * | 4/2001 | Reznak ........................ 718/102 |
| 6,463,352 B1 | 10/2002 | Tadokoro et al. |
| 7,770,173 B2 * | 8/2010 | Farrell et al. .................. 718/104 |
| 7,779,424 B2 * | 8/2010 | Cherkasova et al. .......... 719/321 |
| 2004/0255295 A1 * | 12/2004 | Stackhouse et al. .......... 718/100 |
| 2005/0120104 A1 * | 6/2005 | Boon et al. .................... 709/223 |

OTHER PUBLICATIONS

Cherkasova, Ludmila and Gardner, Rob. "Measuring CPU Overhead for I/O Processing in the Xen Virtual Machine Monitor." USENIX Annual Technical Conference (Apr. 2005).*
Duda, K. J. And Cheriton, D. R. 1999. "Borrowed-virtual-time (BVT) scheduling: supporting latency-sensitive threads in a general-purpose scheduler." SIGOPS Oper. Syst. Rev. 33, 5 (Dec. 1999), 261-276. DOI=http://doi.acm.org/10.1145/319344.319169.*
Code of Federal Regulations, title 7, part 273, section 18, paragraph (g)(1). Jan. 1, 2003.*
Mangan, Timothy. "Server Consolidation / Perceived Performance and Virtual Operating Systems." TMurgent Technologies (Apr. 1, 2005). Retrieved from http://www.tmurgent.com/WhitePapers/PerceivedPerformance_VirtualOS.pdf on Sep. 10, 2010.*
Barham, P. et al., "Xen and the Art of Virtualization", In SOSP '03: Proceedings of the nineteenth ACM symposium on Operating systems principles, pp. 164-177.
Cherkasova, L. et al., "Measuring CPU Overhead for I/O Processing in the Xen Virtual Machine Monitor"; Accepted to 2005 Usenix Annual Technical Conference; 6 pages.
Chase, Jeffrey et al., Sharing and Protection in a Single-Address-Space Operating System, ACM Trans. Comput. Syst., 12(4), 1994; pp. 271-307.

(Continued)

Primary Examiner — Meng An
Assistant Examiner — Brian Chew

(57) ABSTRACT

A method comprises determining an amount of central processing unit (CPU) usage by a driver domain on behalf of a given virtual machine (VM) over a measurement period. The method further comprises determining a share of CPU to schedule for the given VM for a plurality of future scheduling intervals based at least in part on the determined amount of CPU usage by the driver domain on behalf of the given VM over the measurement period. The method further comprises scheduling the determined share of CPU access to the given VM for the plurality of future scheduling intervals.

19 Claims, 5 Drawing Sheets

OTHER PUBLICATIONS

Chun, Brent et al., "PlanetLab: An Overlay Testbed for Broad-Coverage Services", SIG-COMM Comput. Commun. Rev., 33(3); 2003, pp. 3-12.

Druschel, Peter et al., "Lazy Receiver Processing (LRP): A Network Subsystem Architecture for Server Systems", In OSDI '96: Proceedings of the second USENIX symposium on Operating systems design and implementation, New York 1996, pp. 261-275.

Fraser, K. et al., "Reconstructing I/O", Technical Report UCAM-CL-TR-596, University of Cambridge, 2005; pp. 1-16.

Gupta, D. et al., "XenMon: QoS Monitoring and Performance Profiling Tool"; Technical Report HPL-2005-187, HP Labs, 2005, pp. 1-13.

Httperf. [online] Retrieved Jul. 12, 2006 Retrieved from: http://www.hpl.hp.com/research/linux/httperf/ 10 pages.

IBM. The Oceano Project; [online] Retrieved on Jul. 11, 2006 Retrieved from: http://www.research.ibm.com/oceanoproject/index.html 1 page.

Kallahalla, M. et al., "Soft UDC: A Software-Based Data Center for Utility Computing", IEEE Computer, No. 2004, pp. 46-54.

Leslie, Ian et al., "The Design and Implementation of an Operating System to Support Distributed Multimedia Applications", IEEE Journal of Selected Areas in Communications, 14(7), 1996, pp. 1280-1297.

Mogul, J.C., et al, "Eliminating Receive Livelock in an Interrupt-driven Kernel"; ACM Trans. Comput. Syst., 15(3), 1997, 14 pages.

Nagar, S., et al., "Improving Linux Resource Control Using CKRM", Ottawa Linux Symposium, 2004, 16 pages.

Waldspurger, C. et al., "Memory Resource Management in VMware ESX Server", SIGOPS Oper. Syst. Rev., 36(SI), 2002 pp. 181-194.

Whitaker, A. et al., "Scale and Performance in the Denali Isolation Kernel"; SIGOPS Oper. Syst. Rev., 36(SI), 2002, pp. 195-209.

U.S. Appl. No. 11/070,674, filed Mar. 2, 2005.

* cited by examiner

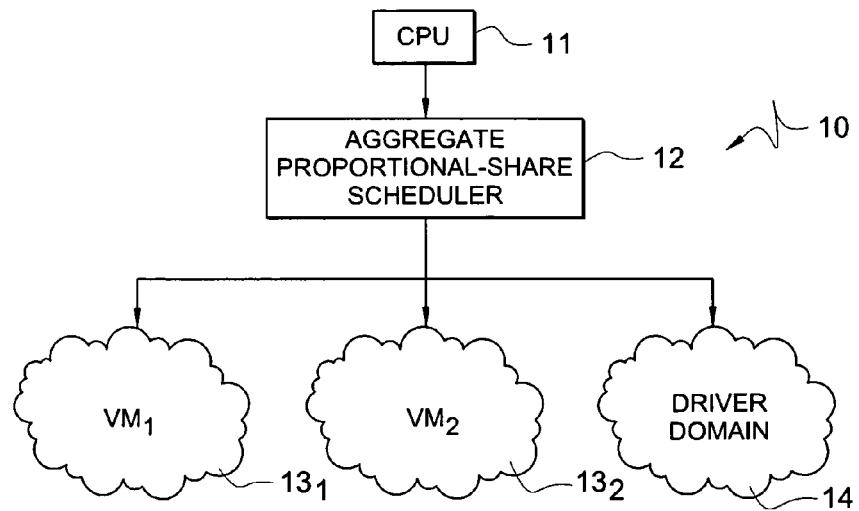
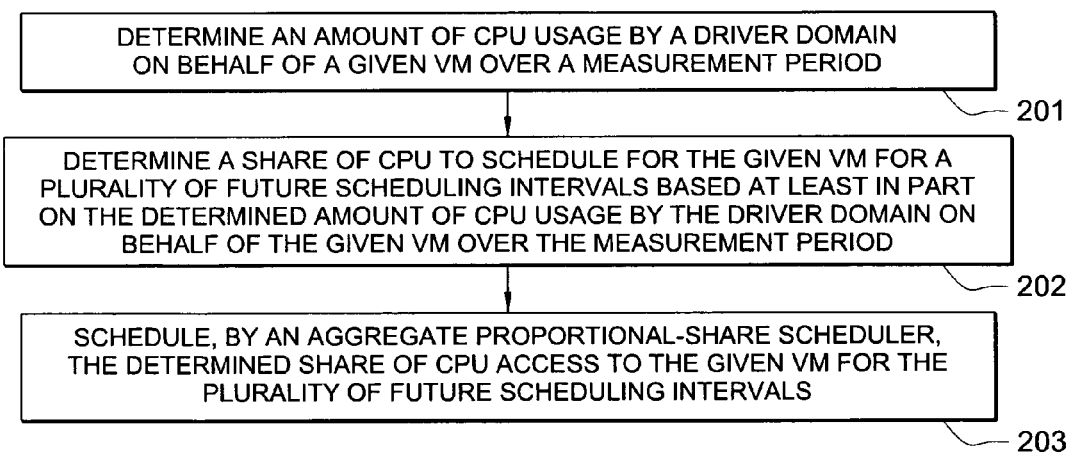

US 8,209,682 B2

SYSTEM AND METHOD FOR CONTROLLING AGGREGATE CPU USAGE BY VIRTUAL MACHINES AND DRIVER DOMAINS OVER A PLURALITY OF SCHEDULING INTERVALS

CROSS-REFERENCE TO RELATED APPLICATIONS

This application is related to co-pending and commonly assigned U.S. patent application Ser. No. 11/070,674 filed Mar. 2, 2005 titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", the disclosure of which is hereby incorporated herein by reference. This application is also related to the following concurrently filed and commonly assigned U.S. Patent Applications: 1) Ser. No. 11/493,506, Filed Jul. 26, 2006 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", 2) Ser. No. 11/493,348, Filed Jul. 26, 2006 titled "SYSTEM AND METHOD FOR CONTROLLING AGGREGATE CPU USAGE BY VIRTUAL MACHINES AND DRIVER DOMAINS", 3) Ser. No. 11/493,492, Filed Jul. 26, 2006 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", 4) Ser. No. 11/493,179 titled "SYSTEMS AND METHODS FOR FLEXIBLY CONTROLLING RESOURCE USAGE BY A DRIVER DOMAIN ON BEHALF OF A VIRTUAL MACHINE", and 5) Ser. No. 11/494,187, Filed Jul. 26, 2006 titled "SYSTEMS AND METHODS FOR CONTROLLING RESOURCE USAGE BY A DRIVER DOMAIN ON BEHALF OF A VIRTUAL MACHINE", the disclosures of which are hereby incorporated herein by reference.

FIELD OF THE INVENTION

The below description is related generally to controlling resource utilization, and more particularly to a CPU scheduler that schedules CPU for a virtual machine based on an aggregate usage of CPU for the virtual machine and a driver domain, such as an isolated driver domain, wherein an amount of usage by the driver domain on behalf of a given VM is accounted for over a plurality of future scheduling intervals for the given VM.

DESCRIPTION OF RELATED ART

Resource pools are collections of computing resources, such as clusters of servers, racks of blades, or other computing resources. The utility data center (UDC) available from Hewlett-Packard Company is one example of a resource pool. Depending on the granularity of a given implementation, a resource pool may be a collection of separate computing devices (e.g., separate servers, separate clusters of servers, etc.) or it may be a collection of resources on a common computing device (e.g., multiple processors on a single server). Various types of resource pools are known, and techniques have been developed for managing access to such resource pools. For instance, virtualization services have been developed that offer interfaces that support the lifecycle management (e.g., create, destroy, move, size capacity) of resource containers (e.g., virtual machines, virtual disks) that provide access to shares of capacity. Various consumers (e.g., applications) may share access to the resources of a resource pool. That is, various consumers may share utilization of the resources in a resource pool for servicing their respective workloads. In this sense, a "consumer" refers to anything (e.g., process, etc.) that consumes capacity of the pool's resources. A consumer generally consumes capacity for use in servicing the consumer's workload. Thus, the consumer has a "demand" for capacity from the resource pool for servicing its workload in a desired manner. In some implementations, workloads are assigned to the resource containers which are then associated with resources. A "processor resource," as used herein, refers to any computing resource now known or later developed that a consumer utilizes in servicing a workload, including without limitation central processing unit(s) (CPU(s)).

To facilitate sharing of a resource pool's capacity between a plurality of consumers (e.g., a plurality of applications), some type of scheme for managing allocation of the pool's capacity among the consumers may be employed. Without such management of allocation, a given consumer may consume all or substantially all of the pool's capacity for servicing its workload, thus leaving the remaining consumers with insufficient capacity for supporting their respective workloads. Accordingly, consumers generally desire some assurance that they will be allocated sufficient capacity of the resource pool to enable the consumers to satisfy their respective quality of service (QoS) goals. As discussed further below, schedulers may be configured to allocate capacity of a resource pool among the consumers in an attempt to manage such allocation in a manner that provides some assurance that the consumers can satisfy their QoS goals (e.g., by balancing allocation among the consumers).

Each resource in a pool may have a processor scheduler that monitors its workloads' demands and dynamically varies the allocation of processor capacity, e.g., CPU, to the workloads, thereby managing the utilization of the processor resources by the various consumers. For instance, the scheduler may dynamically vary allocation of the processor's capacity in a manner that attempts to provide each consumer with access only to the capacity it needs (for servicing its current workload). As a workload's demand increases, the scheduler may increase the amount of the processor's capacity that is allocated to such workload; and as a workload's demand decreases, the scheduler may decrease its allocation of the processor's capacity to such workload. Schedulers are well known for scheduling access to shared processor resources for competing consumers.

Traditionally, general-purpose operating systems assume that they have complete control of a system's physical resources. The operating system ("OS") thus assumes responsibility for such system management as allocation of physical resources, communication, and management of external storage, as examples. Virtualization changes this assumption of sole responsibility by a single OS for management of the system. Similar to the way that a general-purpose OS presents the appearance to multiple applications that each has unrestricted access to a set of computing resources, a virtual machine manages a system's physical resources and presents them to one or more OSs, thus creating for each OS the illusion that it has full access to the physical resources that have been made visible to it.

The current trend toward virtualized computing resources and outsourced service delivery has caused interest to surge in Virtual Machine Monitors (VMMs) that enable diverse applications to run in isolated environments on a shared hardware platform. A VMM is a layer of software that runs on a host platform and provides an abstraction of a complete computer system to higher-level software. That is, a VMM, which may also be referred to as a "hypervisor," is a software layer that virtualizes the available resources of a computer and multiplexes them among one or more guest OSs on the computer system. Many such VMMs are available in the art, such as the VMM known as VMware™ available from VMware, Inc. An abstraction created by VMM is called a virtual machine (VM). Accordingly, a VMM aids in subdividing the ample resources of a modern computer and creating the illusion of multiple virtual machines each running a separate OS instance.

Traditionally, schedulers separately schedule CPU access for different VMs and driver domains. As an example, a weighted proportional-share scheduler may schedule CPU access to different VMs in proportion to a respective weight assigned to each VM. However, a VM may require an access of a device driver in a driver domain, and thus the device driver may consume additional CPU utilization on behalf of the requesting VM. As such, the combined CPU utilization of a VM and a driver domain on behalf of such VM may effectively cause the total CPU usage attributable to the VM to become out of proportion to the VM's respective weight. Thus, a desire exists for a scheduler that is operable to schedule CPU access for VMs in a manner that provides CPU access in proportion to respective weightings of the VMs for each VM's aggregate CPU usage. That is, a desire exists for a weighted proportional-share scheduler that fairly allocates CPU usage to VMs taking into consideration aggregate CPU utilization of a VM and of a driver domain that is attributable to the VM.

BRIEF DESCRIPTION OF THE DRAWINGS

FIG. 1 shows an exemplary system according to an embodiment of the present invention;

FIGS. 2A-2B show exemplary operational flows according to certain embodiments of the present invention;

DETAILED DESCRIPTION

Figure 2B:
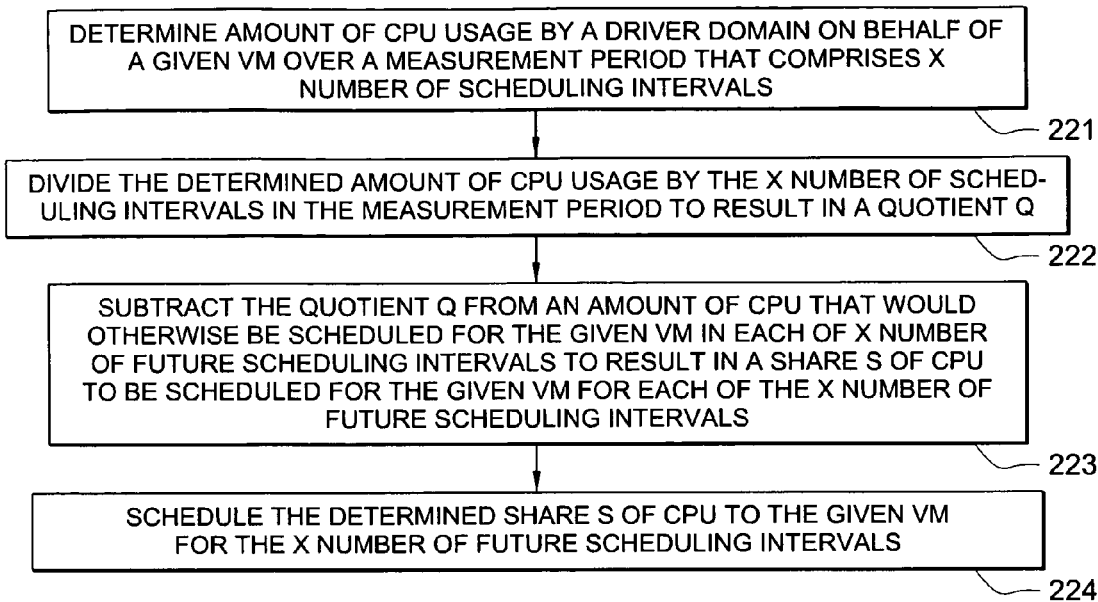

FIG. 1 shows an exemplary system according to an embodiment of the present invention. System 10 comprises an aggregate proportional-share scheduler 12, embodiments of which are described further herein. Aggregate proportional-share scheduler 12 schedules access to CPU 11 for various consumers, such as virtual machines (VMs) $13_1$ and $13_2$ and driver domain 14. While 2 VMs and 1 driver domain are shown for simplicity in FIG. 1, any number of such VMs and driver domains may be implemented in a given system for which aggregate proportional-share scheduler 12 schedules access to CPU 11. Also, CPU 11 may comprise any number of CPUs. The term "CPU" is used broadly herein to refer to any processing logic for processing demands of a consumer's workload.

As described further herein, driver domain 14 comprises a device driver that may be used by VMs $13_1$ and $13_2$ for accessing a shared resource. For instance, driver domain 14 may be a network driver domain that comprises a device driver for a network interface, which VMs $13_1$ and $13_2$ may use to access a communication network. Such a device driver thus uses CPU 11 for servicing the requests of the VMs $13_1$ and $13_2$. Accordingly, as described further herein, a corresponding amount of CPU usage by the driver domain 14 on behalf of a VM may be attributed to such VM. In general, an amount of resource usage by the driver domain 14 is considered as being "on behalf" of a given VM when the resource usage by the driver domain 14 is incurred for servicing demands of the given VM. Embodiments of aggregate proportional-share scheduler 12 presented herein take into consideration not only the CPU usage of an individual VM, but also the CPU usage of driver domain 14 that is attributable to the VM, for scheduling CPU access for the VM. That is, aggregate proportional-share scheduler 12 considers an aggregate of CPU usage attributable to a given VM, including CPU usage of driver domain 14 that is attributable to the given VM, in scheduling shares of CPU to the given VM in proportion to the respective weight assigned to the given VM.

As described further herein, in certain embodiments, an amount of CPU usage by a driver domain 14 on behalf of a given VM during at least one scheduling interval may be distributed across a plurality of future scheduling intervals in determining an amount CPU to schedule for the given VM over the plurality of future scheduling intervals. For instance, CPU usage by a driver domain 14 on behalf of a given VM during a given "measurement period" may be determined, wherein the measurement period may comprise several scheduling intervals. The usage of CPU by the driver domain 14 on behalf of the given VM during the measurement period may be subtracted from the amount of CPU that would otherwise be scheduled for the given VM during future scheduling intervals. According to certain embodiments of the present invention, the amount of CPU usage by the driver domain 14 on behalf of the given VM during the measurement period may be evenly divided among a plurality of next scheduling intervals wherein the quotient of such division is subtracted from the amount of CPU that would otherwise be scheduled for the given VM in each of the plurality of next scheduling intervals.

For example, suppose that an aggregate proportional-share scheduler schedules access to CPU in 100 millisecond (ms) scheduling intervals; and further suppose that a given VM is weighted such that it is to receive a 30% share of CPU usage (e.g., 30 ms of each of the 100 ms scheduling intervals). Now suppose that over a measurement period of 5 scheduling intervals (500 ms), driver domain 14 uses 75 ms of CPU on behalf of the given VM. Thus, the aggregate proportional-share scheduler may subtract the 75 ms of CPU usage from future CPU scheduled for the given VM. In certain embodiments of the present invention, the 75 ms is divided by the number of scheduling intervals in the measurement period (i.e., 5 in this example) to arrive at a quotient, which is 15 ms in this example. The quotient (i.e., 15 ms in this example) is then subtracted from the amount of CPU usage that would otherwise be scheduled for the given VM in each of the next 5 scheduling intervals (i.e., the next number of scheduling intervals equal to the number of scheduling intervals included in the measurement period). Thus, in this example, the given VM would be scheduled 15 ms (i.e., 30 ms it would otherwise receive minus the quotient of 15 ms equals 15 ms) for each of the next 5 scheduling intervals. In this manner, the amount of CPU usage by the driver domain 14 during the measurement period that is attributable to the given VM is distributed across a plurality of future scheduling intervals in determining the amount of CPU to be scheduled for the given VM in each of the future scheduling intervals. Exemplary embodiments of the present invention are described further below.

Various types of weighted proportional-share CPU schedulers are known, and any weighted proportional-share scheduler now known or later developed may be adapted according to embodiments of the present invention in order to schedule CPU access for VMs based on an aggregate of CPU usage attributable to each VM. As one example, an embodiment that adapts the well-known SEDF scheduler for implementing aggregate proportional-share scheduler 12 is described further herein. Again, embodiments of the present invention are not limited to the SEDF scheduler, but may be utilized for adapting any weighted proportional-share CPU scheduler in the manner described herein.

As mentioned above, traditionally weighted proportional-share schedulers schedule CPU access to VMs without considering any CPU usage of a driver domain that is attributable to the VMs. Thus, a given VM may consume more than its proportional share of CPU usage when considering CPU usage of a driver domain that is attributable to the given VM in addition to the given VM's direct usage of CPU. For example, suppose that VMs $13_1$ and $13_2$ are weighted equally such that they each should receive equal shares of CPU, say a 30% share of each scheduling interval. In this manner, a weighted proportional-share scheduler may have scheduling intervals of 100 milliseconds (ms) each, for example, wherein the scheduler will schedule 30 ms of CPU access to each of VMs $13_1$ and $13_2$ during each scheduling interval. In this manner, the scheduler attempts to fairly allocate CPU capacity to the VMs in proportion to their respective weights, which are equal in this example. However, suppose that during a given scheduling interval driver domain 14 consumes some amount of CPU capacity on behalf of VM $13_1$. Because the traditional scheduler schedules CPU usage to each VM and driver domain independently without any consideration of the CPU usage of the driver domain that is attributable to the VMs, the VM $13_1$ may receive a disproportionate amount of aggregate CPU usage. That is, the scheduler may schedule a 30% share of a scheduling interval to each of VMs $13_1$ and $13_2$, and the scheduler may also schedule an additional share of CPU capacity to driver domain 14, which driver domain 14 uses to process a request from VM $13_1$. Thus, in this example, when considering the aggregate of VM $13_1$'s allocated CPU and the CPU usage of driver domain 14 that is on behalf of VM $13_1$, VM $13_1$ effectively receives an aggregate CPU usage that is disproportionate to its assigned weight. Embodiments of the present invention address this issue, and provide techniques that enable a scheduler to perform weighted proportional-share scheduling fairly when considering an aggregate of CPU usage attributable to each VM, including CPU usage of a driver domain that is attributable to the VM.

Thus, embodiments of the present invention provide systems and methods for controlling aggregate CPU usage by VMs $13_1$ and $13_2$ and driver domains 14. For instance, certain embodiments of the present invention provide a weighted proportional-share scheduler 12 for scheduling access to CPU 11 for VMs $13_1$ and $13_2$ in proportion to their respective weights taking into account aggregate CPU usage of the VMs themselves and the CPU usage by driver domain(s) 14 attributable to the VMs. Further, embodiments of the present invention enable an amount of CPU usage by a driver domain 14 on behalf of a given VM to be distributed across a plurality of future scheduling intervals in determining the amount of CPU to be scheduled for the given VM in each of the plurality of future scheduling intervals. That is, the accounting for an amount of CPU usage by a driver domain on behalf of a given VM during a measurement period may be distributed across a plurality of future scheduling intervals. Such distributed accounting is somewhat analogous to incurring debt (e.g., a mortgage loan) and repaying the debt over a plurality of future payment intervals. For instance, as in the example mentioned above, if a driver domain consumes 75 ms of CPU on behalf of a given VM during a measurement period comprising 5 scheduling intervals, the "debt" of 75 ms of CPU usage gained by the given VM can be repaid over the next 5 scheduling intervals (e.g., 15 ms of CPU usage can be subtracted from the amount of CPU usage that the given VM would otherwise receive in each of the next 5 scheduling intervals).

As described above, virtualization enables resources to be shared between a plurality of VMs. A VMM is a software layer that virtualizes the available resources of a computer system and multiplexes them among one or more guest OSs on the computer system. As used herein, the term guest operating system refers to one of the OSs that the VMM can host, and the term domain refers to a running virtual machine within which a guest OS executes. Thus, the terms virtual machine (VM) and domain are used interchangeably herein. A privileged management domain refers to a domain that manages the creation and/or termination of other guest domains and may manage other parameters, such as CPU scheduling parameters, resource allocation policies, etc. A driver domain refers to a domain in which a device driver for one or more shared resources resides. An isolated driver domain refers to a domain in which a device driver is placed such that failure of the device driver does not interrupt any other domains in the system. The VMM may be referred to as a hypervisor because it operates at a higher privilege level than the supervisor code of the guest OSs that it hosts. Thus, the terms VMM and hypervisor are used interchangeably herein.

Typically, VMMs are classified into two groups: 1) "Type I VMMs" that run directly on physical hardware and thus provide an abstraction that is identical to the hardware underneath the VMM, such as IBM's VM/370; and 2) "Type II VMMs" that run as an application on a host operating system, such as user-mode Linux. Type I and Type II machines are available in the art. For instance, VMWare, Inc. provides both types of VMMs. In a traditional Type I VMM, the exposed virtual hardware functionality is identical to the underlying machine. This "full virtualization" has the main benefit of allowing unmodified OSs to be hosted. However, support for full virtualization was never a part of prevalent IA-32 (e.g., x86) architecture, and the efficient virtualization is difficult, i.e., it can be only achieved at the cost of increased complexity and reduced performance.

Several aspects of virtualization make it difficult or slow for a VMM to provide an interface that is identical to the physical hardware. For instance, some architectures include instructions whose behavior depends on whether the CPU is running in privileged or user mode (sensitive instructions), yet which can execute in user mode without causing a trap to the VMM. Virtualizing these sensitive-but-unprivileged instructions generally requires binary instrumentation, which adds significant complexity and may add significant overhead. For example, VMware's ESX Server dynamically rewrites portions of the hosted machine code to insert traps wherever VMM intervention might be required. In addition, emulating I/O devices at the low-level hardware interface (e.g. memory-mapped I/O) causes execution to switch frequently between the guest OS accessing the device and the VMM code emulating the device. To avoid the overhead associated with emulating a low-level device interface, most VMMs encourage or require the user to run a modified version of the guest OS. For example, the VAX VMM security kernel, VMware Workstation's guest tools add special drivers in the guest OS to accelerate the virtualization of some devices.

Another virtualization technique, called paravirtualization, has been recently introduced, that avoids the drawbacks of full virtualization by presenting a virtual model machine abstraction that is similar but not identical to the underlying hardware. This technique provides improved performance, but it also requires modification to the guest OSs, i.e. the commodity system needs to be ported to a paravirtualized environment. Xen™ is an example of a known VMM for x86 based on the paravirtualization technique, which supports execution of multiple guest OSs and that does not require changes to the application binaries interfaces (ABI), and hence no modifications are required to guest applications. Xen is an open source VMM, and the latest stable release of Xen is version 3.0.1 available as of the filing of this application. In certain virtualization techniques, device drivers for shared resources are located in a privileged management domain, and thus to access those shared resources the virtual machines communicate with such privileged management domain. Further, in certain virtualization techniques, device drivers for shared resources are located in an isolated driver domain to improve dependability, maintainability, and manageability of the shared resources.

For various reasons, including without limitation management of resource allocation, it is often desirable to monitor the CPU utilization that is attributable to each of the VMs that may be implemented on a system. Traditional monitoring systems typically report the amount of CPU allocated by the scheduler for execution of a particular VM over time. However, this method often fails to reveal the "true" usage of the CPU by different VMs. For instance, in certain virtualization techniques, device drivers for shared resources are located in isolated driver domains, and thus to access those shared resources the VMs communicate with such isolated driver domains. Accordingly, the isolated driver domains use the CPU in processing the access requests received from the VMs. The CPU utilization of the isolated driver domains in servicing the requests of each VM (requesting to access a resource) are not attributed to the corresponding VMs in the traditional technique of monitoring VM CPU utilization (i.e., as those techniques report the amount of CPU allocated to a VM by the scheduler). Thus, the full CPU utilization of the VMs, including the corresponding isolated driver domain CPU utilization, is not determined.

For example, virtualization of input/output (I/O) devices results in an I/O model where the data transfer process involves additional system components, such as an isolated driver domain in which device drivers for the I/O resources reside. Hence, the CPU usage when the isolated driver domain handles the I/O data on behalf of a particular VM should be charged to the corresponding VM. However, simply monitoring the CPU utilization allocated by the scheduler to the corresponding VM fails to account for the CPU utilization of the isolated driver domain in handling the I/O data on behalf of such corresponding VM. Thus, the traditional technique of determining CPU utilization of each VM does not fully capture the CPU utilization attributable to a VM, as it fails to account for the corresponding isolated driver domain CPU utilization that is performed for each VM.

Certain techniques for observing communication between a VM and an isolated driver domain and attributing to the VM corresponding CPU usage of the isolated driver domain are described in co-pending and commonly assigned U.S. patent application Ser. No. 11/070,674 filed Mar. 2, 2005 titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", the disclosure of which is hereby incorporated herein by reference. Certain embodiments presented therein attribute such CPU usage of an isolated driver domain to a corresponding VM based on a memory page exchange count. While such usage of memory page exchange count may provide a good estimate, it may introduce some inaccuracy due, for example, to the specific memory page exchange procedure employed by the VMM. For instance, often the VMM commercially known as Xen-3™ opportunistically performs additional memory page exchanges in order to keep a sufficient pool of memory pages in an isolated driver domain. Due to Direct Memory Access (DMA), some of the I/O data from a VM can be directly written to memory in an isolated driver domain ("IDD").

Certain embodiments of concurrently filed and commonly assigned U.S. patent application Ser. No. 11/493,506, Filed Jul. 26, 2006 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", the disclosure of which is incorporated herein by reference, provide a more accurate technique for observing communication between a VM and a network driver domain (e.g., an isolated network driver domain ("net-IDD")) and attributing to the VM corresponding CPU usage of the network driver domain, by observing the amount of communication flowing through a virtualized interface between such VM and the network driver domain. That is, in U.S. patent application Ser. No. 11/493,506, Filed Jul. 26, 2006 titled "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE" exemplary systems and methods are disclosed for observing an amount of communication through a virtualized interface between a VM and a network driver domain and determining from such observed amount of communication a corresponding amount of the network driver domain's CPU utilization that is attributable to the VM. Thus, a corresponding amount of a network driver domain's CPU utilization to attribute to a VM may be computed based on an amount of communication (e.g., number of network packets) observed through the virtualized interface between the VM and the network driver domain.

In some instances, however, the amount of CPU utilization of a network driver domain may not correspond equally to the amount of communication between the VM and the network driver domain. Rather, the amount of CPU utilization of the network driver domain may differ depending on certain characteristics of the communication. For instance, in some systems the amount of CPU utilization of the network driver domain may differ for different sized packets. Additionally or alternatively, the amount of CPU utilization of the network driver domain may differ between packets received from a VM directed to the network driver versus packets from the communication network directed to the VM. Thus, certain embodiments of concurrently filed and commonly assigned U.S. patent application Ser. No. 11/493,492, Filed Jul. 26, 2006 titled "SYSTEM AND METHOD FOR ATTRIBUT- ING TO A CORRESPONDING VIRTUAL MACHINE CPU UTILIZATION OF A NETWORK DRIVER DOMAIN BASED ON WEIGHTED COMMUNICATION", the disclosure of which is incorporated herein by reference, provide an even further accurate technique attributing a network driver domain's CPU usage to a corresponding VM. In such further accurate technique, a "weighted" amount of communication observed through a virtualized interface between a VM and a network driver domain is determined, wherein such weight is determined at least in part on certain characteristics of the observed communication, such as the size of the observed packets and/or the direction of the packets along a communication path. The "weighted" amount of communication observed may then be used for more accurately determining a corresponding amount of CPU utilization by the network driver domain to attribute to the VM.

Embodiments of the present invention may employ any of the above-identified techniques, or any other technique now known or later developed, for attributing CPU usage of a driver domain to a corresponding VM that caused such CPU usage by the driver domain. In concurrently filed and commonly assigned U.S. patent application Ser. No. 11/493,348, Filed Jul. 26, 2010 titled "SYSTEM AND METHOD FOR CONTROLLING AGGREGATE CPU USAGE BY VIRTUAL MACHINES AND DRIVER DOMAINS", the disclosure of which is incorporated herein by reference, exemplary embodiments of an aggregate proportional-share scheduler are described. In such embodiments, once an amount of CPU usage of a driver domain that is attributable to a VM is determined, an aggregate proportional-share scheduler 12 may schedule CPU access to the VM based on the aggregate CPU usage attributable to such VM (e.g., both the VM's direct CPU usage and the CPU usage of a driver domain attributable to the VM). As described further herein, embodiments of the present invention further recognize that it may be desirable to spread an accounting for CPU usage by a driver domain on behalf of a given VM across a plurality of future scheduling intervals in determining an amount of CPU to schedule for the given VM in each of the plurality of future scheduling intervals. For instance, the measurement of an amount of CPU used by a driver domain on behalf of a given VM may measure such usage over several scheduling intervals, and thus certain embodiments of the present invention provide an aggregate proportional-share scheduler 12 that is operable to distribute an accounting for such measured amount over several future scheduling intervals (e.g., equal to the number of scheduling intervals in the measurement period) in determining the amount of CPU to schedule for the given VM in each of such future scheduling intervals.

Turning to FIG. 2A, an exemplary operational flow diagram according to one embodiment of the present invention is shown. In operational block 201, an amount of CPU usage by a driver domain on behalf of a given VM over a measurement period is determined. As described further herein, such a measurement period may comprise several scheduling intervals. In operational block 202, a share of CPU to schedule for the given VM for a plurality of future scheduling intervals is determined based at least in part on the determined amount of CPU usage by the driver domain on behalf of the given VM over the measurement period. For instance, as described further herein, in certain embodiments the amount of CPU usage that would otherwise be scheduled for the given VM in each of the plurality of future scheduling intervals is reduced by an allotted portion of the determined amount of CPU usage by the driver domain (e.g., reduced by a quotient of the determined amount of CPU usage by the driver domain divided by the number of scheduling intervals in the measurement period). In block 203, an aggregate proportional-share scheduler 12 schedules the determined share of CPU access to the given VM for the plurality of future scheduling intervals.

An exemplary operational flow according to one embodiment of the present invention is shown in FIG. 2B. In operational block 221, an amount of CPU usage by a driver domain on behalf of a given VM over a measurement period that comprises X number of scheduling intervals is determined. X may be 1 or more. Thus, in certain embodiments, X is a plurality of scheduling intervals. In block 222, the determined amount of CPU usage is divided by the X number of scheduling interval in the measurement period to result in a quotient Q. In block 223, the quotient Q is subtracted from an amount of CPU that would otherwise be scheduled for the given VM in each of X number of future scheduling intervals to result in a share S of CPU to be scheduled for the given VM for each of the X number of future scheduling intervals. In block 224, the scheduler schedules the determined share S of CPU to the given VM for the X number of future scheduling intervals.

Figure 3:
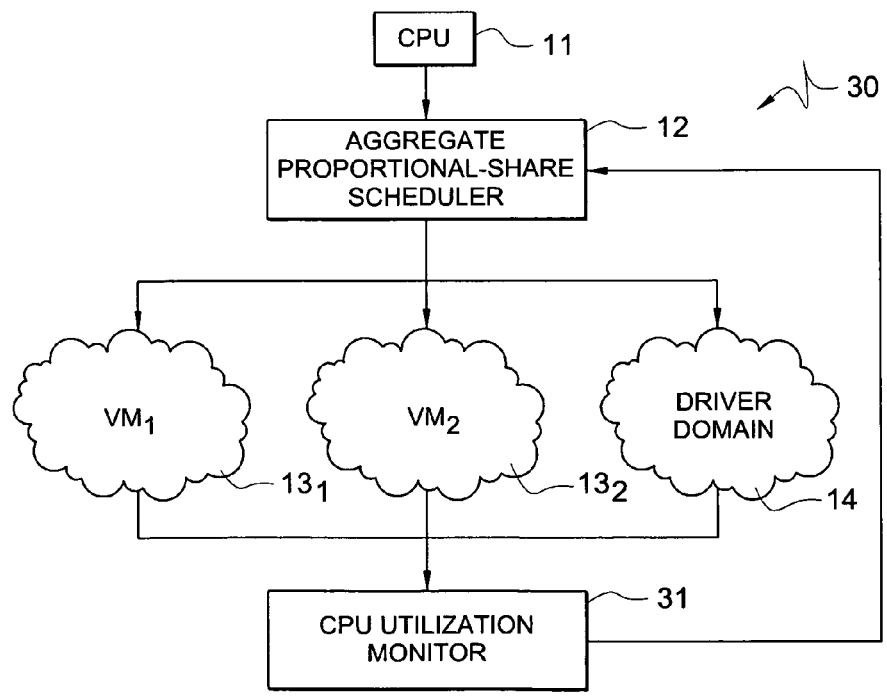
FIG. 3 shows an exemplary system according to one embodiment of the present invention.

FIG. 3 shows an exemplary system 30 according to one embodiment of the present invention. As with system 10 of FIG. 1, system 30 comprises aggregate proportional-share scheduler 12, embodiments of which are described further herein. Aggregate proportional-share scheduler 12 schedules access to CPU 11 for various consumers, such as virtual machines (VMs) $13_1$ and $13_2$ and driver domain 14. Embodiments of aggregate proportional-share scheduler 12 presented herein take into consideration not only the CPU usage of an individual VM, but also the CPU usage of driver domain 14 that is attributable to the VM, for scheduling CPU access for the VM. That is, aggregate proportional-share scheduler 12 considers an aggregate of CPU usage attributable to a given VM, including CPU usage of driver domain 14 that is attributable to the given VM, in scheduling shares of CPU to the given VM in proportion to the respective weight assigned to the given VM. As described further herein, aggregate proportional-share scheduler 12 accounts for CPU usage of driver domain 14 on behalf of a given VM during a measurement period over a plurality of future scheduling intervals.

In the exemplary system 30 of FIG. 3, a CPU utilization monitor 31 is included, which is operable to monitor CPU usage of driver domain 14 and attribute the CPU usage of the driver domain 14 to the corresponding VM that caused such CPU usage. That is, driver domain 14 may consume CPU capacity on behalf of a given VM (e.g., for performing tasks requested by a given VM), and CPU utilization monitor 31 may attribute such CPU utilization of the driver domain 14 to the given VM. CPU utilization monitor 31 may employ the techniques described in any of the following co-pending U.S. Patent Applications, as examples, for attributing CPU utilization of the driver domain 14 to the corresponding VM: 1) U.S. patent application Ser. No. 11/070,674 filed Mar. 2, 2005 titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", 2) concurrently filed U.S. patent application Ser. No. 11/493, 506, Filed Jul. 26, 2006 "SYSTEM AND METHOD FOR ATTRIBUTING TO A CORRESPONDING VIRTUAL MACHINE CPU UTILIZATION OF A NETWORK DRIVER DOMAIN BASED ON OBSERVED COMMUNICATION THROUGH A VIRTUALIZED INTERFACE", and 3) concurrently filed U.S. patent application Ser. No. 11/493, 492, Filed Jul. 26, 2006 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNI- CATION", the disclosures of which are incorporated herein by reference. Of course, other techniques now known or later developed for attributing CPU utilization of a driver domain to a corresponding VM for which the CPU usage is on behalf of may be employed by CPU utilization monitor 31 in other embodiments. The amount of CPU utilization of the driver domain on behalf of a given VM may be measured, by CPU utilization monitor 31, over a measurement period that may comprise a plurality of scheduling intervals.

Figure 4:
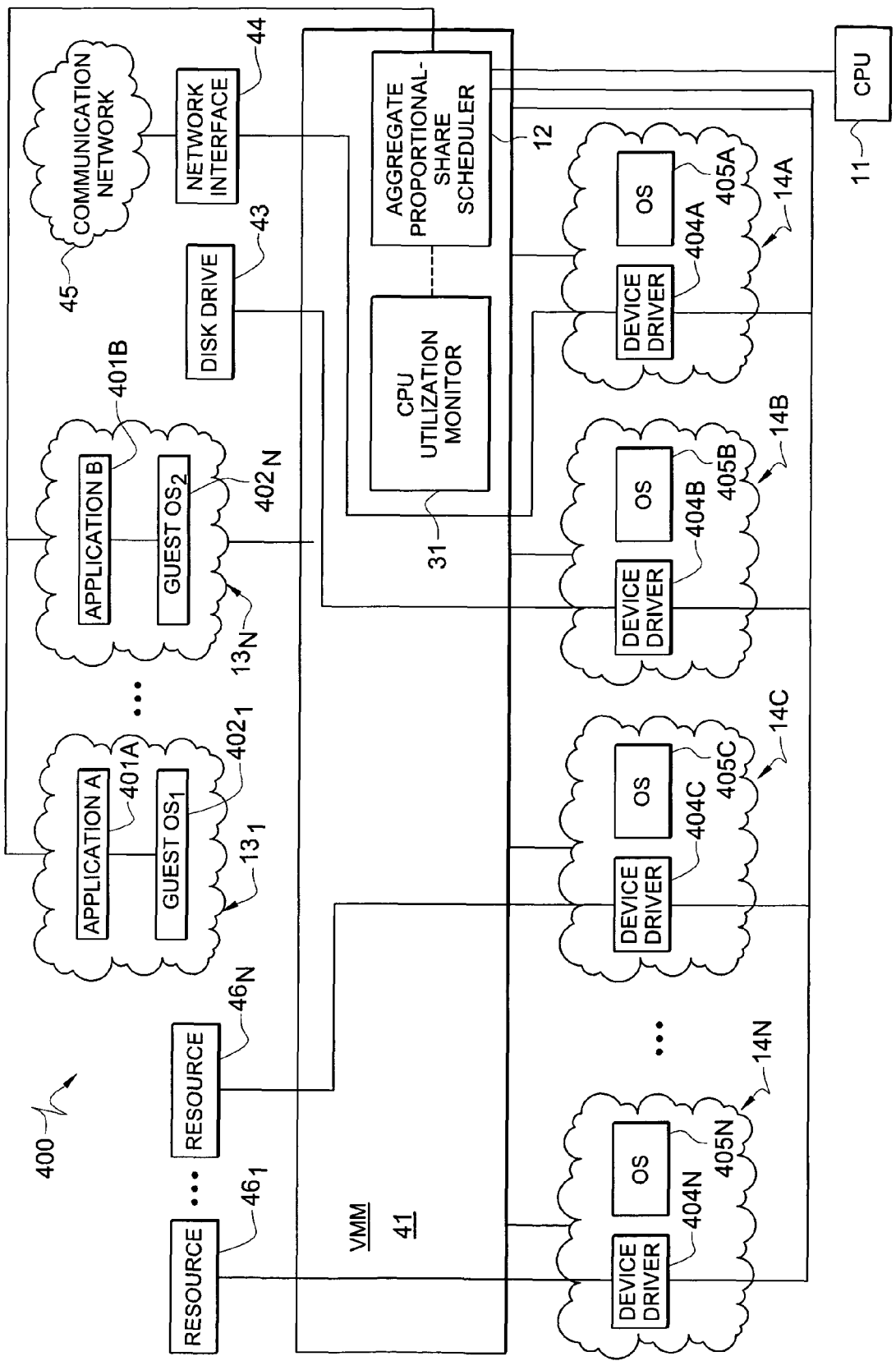
FIG. 4 shows an exemplary virtualized system in which an embodiment of an aggregate proportional-share scheduler is employed.

FIG. 4 shows an exemplary virtualized system in which an embodiment of aggregate proportional-share scheduler 12 is employed. As shown, computer system 400 has any number "N" of VMs or "domains" $13_1, \ldots, 13_N$ implemented thereon (referred to collectively as VMs 13). Such virtualization may be achieved utilizing any suitable technique now known or later discovered. Within each VM 13, a guest OS is executing, such as guest $OS_1$ $402_1$ in VM $13_1$ and guest $OS_N$ $402_N$ in VM $13_N$. Further, one or more applications may be executing within each VM 13, such as application A 401A in VM $13_1$ and application B 401B in VM $13_N$. VMM 41 is implemented, which is a software layer that virtualizes the available resources of computer system 400 and multiplexes them among the various VMs 13 (e.g., the various guest OSs) on the computer system.

System 400 further includes CPU 11, and various shared resources of which VMM 41 manages access by the various VMs 13. The system's shared resources include I/O resources, such as disk drive 43 (e.g., hard drive, floppy drive, tape drive, optical drive, SCSI interface, IDE, etc.) and network interface 44 (e.g., any of a variety of different network interface cards (NICs) and/or adapters), which enables system 400 to interface to communication network 45 (which may be a local area network (LAN), the Internet or other Wide Area Network (WAN), an intranet, a wireless network, telephony network, any combination of the aforementioned networks, and/or any other communication network now known or later developed within the networking arts which permits two or more computers to communicate with each other). The shared resources may include any number of other resources $46_1, \ldots, 46_N$ to which VMM 41 manages access of the VMs 13, examples of which include without limitation memory (e.g., RAM) and block data storage (e.g., disks).

Any number of driver domains, such as driver domains 14A-14N (referred to collectively as driver domains 14), may also be included, each of which contain device drivers for certain ones of the shared resources. In certain embodiments, driver domains 14 may each be an isolated driver domain. In the illustrated example, device drivers 404A-404N (referred to collectively as device drivers 404) are included in domains 14A-14N, respectively, for supporting access to disk drive 43, network interface 44, and resources $46_1, \ldots, 46_N$. In the example shown, device driver 404A for accessing network interface 44 resides in driver domain 14A; device driver 404B for accessing disk drive 43 resides in driver domain 14B; device driver 404C for accessing resource $46_N$ resides in driver domain 14C; and device driver 404N for accessing resource $46_1$ resides in driver domain 14N. In this exemplary virtualized system 400, the VMs 13 communicate (e.g., through a virtualized interface supported by VMM 41) to driver domain 14A for accessing network interface 44, to driver domain 14B for accessing disk drive 43, to driver domain 14C for accessing shared resource $46_N$, and to driver domain 14N for accessing shared resource $46_1$. Each of the driver domains 14 also includes an OS 405, such as OS 405A in driver domain 14A, OS 405B in driver domain 14B, OS 405C in driver domain 14C, and OS 405N in driver domain 14N.

As described above, VMM 41 is a software layer that is commonly implemented in virtualization architectures, which virtualizes the available resources of computer system 400 and multiplexes them among the various VMs 13. Thus, to access certain resources, the VMs 13 communicate via the VMM 41 to the driver domains 14 (e.g., either directly, as in a paravirtualized system, or via the VMM intercepting communication of the VMs, as in many fully-virtualized systems). That is, in certain implementations, the system is paravirtualized, in which the guest OS of each VM 13 is adapted in some manner to communicate with VMM 41. In other implementations, the guest OSs may not be so adapted, but instead the VMM 41 may act to intercept certain resource accesses attempted by the guest OSs, in which case embodiments of the present invention may be employed for any such virtualized system (e.g., fully-virtualized or paravirtualized system).

In certain embodiments, the driver domains 14 are implemented as isolated driver domains (IDDs), which isolate failure of a given driver from causing a failure of any other domains (other driver domains, guest domains (e.g., VMs), etc.). Recent studies show that device drivers are frequently responsible for operating system failures. For example, a study from Stanford university found that the Linux drivers have 3 to 7 times the bug frequency as the rest of the OS. Similarly, product support calls for Windows 2000 showed that device drivers accounted for 27% of crashes compared to 2% for kernel support. Device drivers can be viewed as a type of kernel extensions, added after the fact. Commercial operating systems are typically extended by loading unsafe object code and linking it directly with the kernel. To reduce the risk of device misbehavior and to address problems of dependability, maintainability, and manageability of I/O devices, the Xen-3™ virtualization system available from Hewlett-Packard Company uses the complete original OS itself as the compatibility wrapper for a device driver. The original OS effectively becomes an execution container for the driver. Thus, the exemplary system 400 may include IDDs 14, which include device drivers residing therein. In such an implementation, the device drivers may run unmodified in privileged guest OSs. An IDD in which a device driver for supporting access to a communication network may be referred to as a net-IDD herein.

As shown in FIG. 4, a CPU utilization monitor 31 may be implemented that determines, for each of the VMs 13, a corresponding amount of CPU utilization of driver domains 14 that is attributable to such VM 13. Aggregate proportional-share scheduler 12 may take into consideration the aggregate CPU usage of each of VMs 13, including the corresponding amount of CPU usage of driver domains 14 attributable to each VM, for scheduling CPU usage for such VMs 13, as described further herein. Again, as described further herein, aggregate proportional-share scheduler 12 accounts for CPU usage of driver domains 14 on behalf of a given VM during a measurement period over a plurality of future scheduling intervals. For example, the amount of CPU usage of driver domains 14 on behalf of a given VM during a measurement period may be evenly divided in reducing the amount of CPU usage scheduled for the given VM in a plurality of future scheduling intervals.

Figure 5:
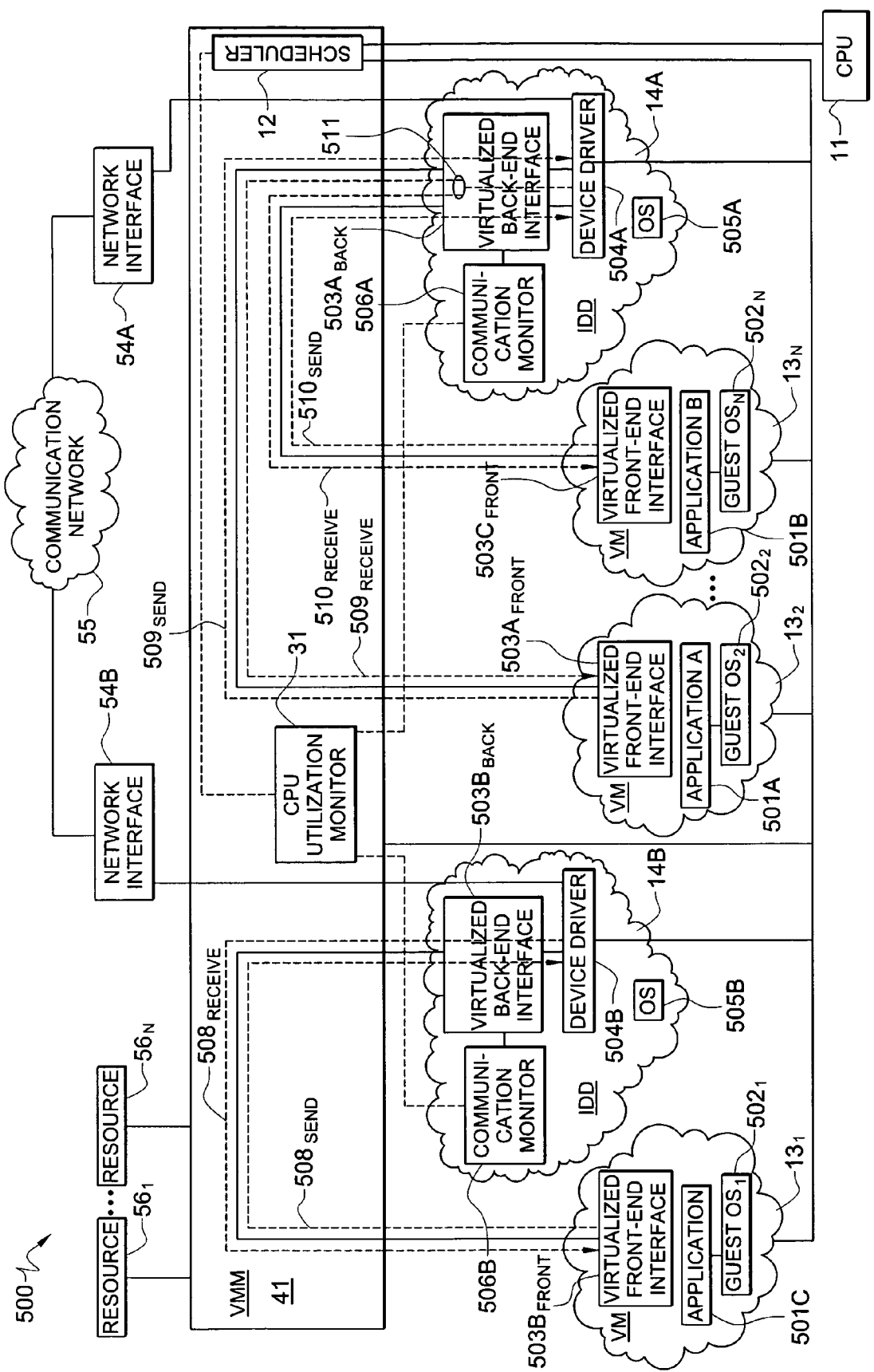
FIG. 5 shows an exemplary system employing an aggregate proportional-share scheduler according to one embodiment of the present invention.

FIG. 5 shows an exemplary system employing aggregate proportional-share scheduler 12 according to one embodiment of the present invention. In this exemplary system 500, a "weighted" amount of communication observed through a virtualized interface between a VM and a network driver domain is determined, wherein such weight is determined at least in part on certain characteristics of the observed communication, such as the size of the observed packets and/or the direction of the packets along a communication path. The weighted amount of communication is determined by communication monitor 506A and/or 506B as described further in concurrently filed U.S. patent application Ser. No. 11/493,492, Filed Jul. 26, 2006 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosure of which is incorporated herein by reference. The "weighted" amount of communication observed is used by CPU utilization monitor 31 for accurately determining a corresponding amount of CPU utilization by the network driver domain to attribute to a given VM.

As shown in FIG. 5, computer system 500 has any number "N" of VMs or "domains" $13_1, 13_2, \ldots, 13_N$ implemented thereon (referred to collectively as VMs 13). Such virtualization may be achieved utilizing any suitable technique now known or later discovered. Within each VM 13, a guest OS is executing, such as guest $OS_1$ $502_1$ in VM $13_1$, guest $OS_2$ $502_2$ in VM $13_2$, and guest $OS_N$ $502_N$ in VM $13_N$. Further, one or more applications may be executing within each VM 13, such as application C 501C in VM $13_1$, application A 501A in VM $13_2$, and application B 501B in VM $13_N$. VMM 41 is implemented, which is a software layer that virtualizes the available resources of computer system 500 and multiplexes them among the various VMs 13 (e.g., the various guest OSs) on the computer system.

System 500 further includes CPU 11, and various shared resources of which VMM 41 manages access by the various VMs 13. The system's shared resources include I/O resources, such as network interfaces 54A and 54B (e.g., any of a variety of different network interface cards (NICs) and/or adapters), which enables system 500 to interface to communication network 55 (which may be a local area network (LAN), the Internet or other Wide Area Network (WAN), an intranet, a wireless network, telephony network, any combination of the aforementioned networks, and/or any other communication network now known or later developed within the networking arts which permits two or more computers to communicate with each other). The shared resources may include any number of other resources $56_1, \ldots, 56_N$ to which VMM 41 manages access of the VMs 13, examples of which include without limitation memory (e.g., RAM) and block data storage (e.g., disks).

Further, in this example, each of the device drivers for accessing network interfaces 54A and 54B is arranged in an isolated driver domain 14. More specifically, device driver 504A for supporting access to network interface 54A is arranged in net-IDD 14A, which also includes an OS 505A. Device driver 504B for supporting access to network interface 54B is arranged in net-IDD 14B, which also includes an OS 505B. Other device drivers for supporting access to other system resources, such as resources $56_1, \ldots, 56_N$, may likewise be arranged in other IDDs, which are not shown in FIG. 5 for simplicity. Thus, any number "N" of device drivers may be isolated in separate driver domains in this manner, thus resulting in any number "N" of IDDs 14.

The VMs 13 communicate through a virtualized interface to the appropriate network driver domain 14 for accessing a given shared resource (e.g., a shared network device driver), as described further herein. In the example shown in FIG. 5, VM $13_1$ communicates through a virtualized interface with device driver 504B of net-IDD 14B for accessing network interface 54B. Similarly, each of VMs $13_2$ and $13_N$ communicates through a virtualized interface with device driver 504A for accessing network interface 54A. Such virtualized interface may be implemented in any suitable manner. In the example shown in FIG. 5, the virtualized interfaces for supporting communication between the VMs and the net-IDDs comprise a front-end interface and a back-end interface. For instance, in the example shown in FIG. 5, the virtualized interface for supporting communication between VM $13_1$ and device driver 504B of net-IDD 14B comprises a back-end interface $503B_{back}$ implemented in net-IDD 14B and a front-end interface $503B_{front}$ implemented in VM $13_1$. Similarly, in the example shown in FIG. 5, net-IDD 14A implements a back-end interface $503A_{back}$ for supporting communication between VMs $13_2$ and $13_N$ and device driver 504A of net-IDD 14A. VM $13_2$ comprises a front-end interface $503A_{front}$, and VM $13_N$ comprises a front-end interface $503C_{front}$. Exemplary implementations of the virtualized interfaces (e.g., front-end and back-end interfaces) are described further in concurrently filed U.S. patent application Ser. No. 11/493,492, Filed Jul. 26, 2006 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosure of which is incorporated herein by reference. Of course, while VM $13_1$ is shown as accessing network interface 54B via net-IDD 14B by communicating through the virtualized interface comprising front-end virtual interface $503B_{front}$ and back-end virtual interface $503B_{back}$, in other instances VM $13_1$ may access other system resources via their respective IDDs by communicating through the corresponding virtualized interfaces, such as accessing network interface 54A via net-IDD 14A by communicating through the back-end virtual interface $503A_{back}$. Similarly, while VM $13_2$ and VM $13_N$ are shown as accessing network interface 54A via net-IDD 14A by communicating through their respective virtualized interfaces, in other instances VMs $13_2$ and/or $13_N$ may access other system resources via their respective IDDs by communicating through the corresponding virtualized interfaces.

As can be seen in FIG. 5, all communication between a VM and a device driver of an IDD flows through the corresponding virtualized interface. For instance, in the example of FIG. 5, all communication between VMs and net-IDD 14A flows through the back-end virtual interface $503A_{back}$, and all communication between VMs and net-IDD 14B flows through the back-end virtual interface $503B_{back}$. Thus, an accurate measurement of the amount of communication between a VM and a net-IDD can be determined through observing the flow of communication through such virtualized interfaces (e.g., through the net-IDD's respective back-end virtual interface). Thus, in the exemplary embodiment of FIG. 1, a communication monitor 506A is employed for monitoring communication through the virtualized back-end interface $503A_{back}$, and a communication monitor 506B is employed for monitoring communication through virtualized back-end interface $503B_{back}$. Of course, a communication monitor need not be implemented for observing the virtualized interface of every IDD of a system, if not so desired.

Each communication monitor 506A-506B may, for example, count the number of communication units flowing between any VM and the corresponding net-IDD. A communication unit generally refers to a unit of data that is employed for communication between a VM and a given IDD. For instance, communication monitor 506A may count the number of network packets flowing through virtualized back-end interface $503A_{back}$ between VM $13_2$ and net-IDD 14A; and communication monitor 506A may likewise count the number of network packets flowing through virtualized back-end interface $503A_{back}$ between VM $13_N$ and net-IDD 14A.

As described further in concurrently filed U.S. patent application Ser. No. 11/493,492, Filed Jul. 26, 2006 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosure of which is incorporated herein by reference, communication monitors 506A and/or 506B may detect certain characteristics of the observed communication, and based on the characteristics determine a "weighted" amount of observed communication. That is, the weighting of observed communication between a given VM and net-IDD may be determined based on characteristics of such observed communication, such as the size of the communication units (e.g., network packets) observed and/or the direction of the communication units observed.

As an example of one characteristic on which weighting of the observed communication may be at least partly based, the size of communication units (e.g., network packets) may, in some systems, affect the amount of CPU utilization by the net-IDD's device driver in processing such communication units. For example, suppose VM $13_2$ communicates network packets having size of 100 bytes each, while VM $13_N$ communicates network packets having size of 1500 bytes each; in certain systems, device driver 504A of net-IDD 14A may consume more CPU utilization for processing the larger network packets of VM $13_N$ than for processing the smaller network packets of VM $13_2$. Thus, the weighting assigned by communication monitor 506A to the observed communication units (e.g., packets) may differ depending on the size of the communication units. For instance, a greater weighting may be assigned for the observed larger packets of VM $13_N$ than for the observed smaller packets of VM $13_2$. However, in certain systems the size of the packets may not significantly impact the amount of CPU utilization of device driver 504A, and thus the weighting of the observed communication by communication monitor 506A may not be based on this size characteristic in some systems. An exemplary benchmarking technique is described further in concurrently filed U.S. patent application Ser. No. 11/493,492, Filed Jul. 26, 2006 titled "SYSTEM AND METHOD FOR ATTRIBUTING TO A CORRESPONDING VIRTUAL MACHINE CPU UTILIZATION OF A NETWORK DRIVER DOMAIN BASED ON WEIGHTED COMMUNICATION", the disclosure of which is incorporated herein by reference, for determining for a target system a weighting, if any, to be used for this size characteristic of observed communication for the system.

As another example of a characteristic on which weighting of the observed communication may be at least partly based, the direction of the observed communication units (e.g., network packets) may, in some systems, affect the amount of CPU utilization by the net-IDD's device driver in processing such communication units. As shown in the example of FIG. 5, communication between a VM and a network driver domain may be bi-directional, wherein certain communication units flow from the VM to the network driver domain (e.g., to be communicated over the communication network 55), while other communication units are received by the network driver domain from the communication network 55 and flow from the network driver domain to the proper VM.

As an example, FIG. 5 shows that communication may flow from VM $13_1$ to device driver 504B of net-IDD 14B along a first direction $508_{send}$ (e.g., a "send" direction) of a communication path between the VM $13_1$ and net-IDD 14B; and communication may flow from device driver 504B of net-IDD 14B to VM $13_1$ along a second direction $508_{receive}$ (e.g., a "receive" direction) of a communication path between the VM $13_1$ and net-IDD 14B. Similarly, FIG. 5 shows that communication may flow from VM $13_2$ to device driver 504A of net-IDD 14A along a first direction $509_{send}$ (e.g., a "send" direction) of a communication path between the VM $13_2$ and net-IDD 14A; and communication may flow from device driver 504A of net-IDD 14A to VM $13_2$ along a second direction $509_{receive}$ (e.g., a "receive" direction) of a communication path between the VM $13_2$ and net-IDD 14A. Likewise, FIG. 5 shows that communication may flow from VM $13_N$ to device driver 504A of net-IDD 14A along a first direction $510_{send}$ (e.g., a "send" direction) of a communication path between the VM $13_N$ and net-IDD 14A; and communication may flow from device driver 504A of net-IDD 14A to VM $13_N$ along a second direction $510_{receive}$ (e.g., a "receive" direction) of a communication path between the VM $13_N$ and net-IDD 14A. In the exemplary system 500 of FIG. 5, virtualized back-end interface $503A_{back}$ includes logic 511 for determining to which of VMs $13_2$ and $13_N$ communication from device driver 504A is to be directed, and directs the communication to the appropriate VM for which the communication is intended. Thus, by monitoring virtualized back-end interface $503A_{back}$, communication monitor 506A can observe all communication flowing between each of the VMs $13_2$ and $13_N$ and net-IDD 14A along both the send and the receive directional paths.

Generally, CPU utilization of network device driver 504A will differ in its processing of communication along a send path (i.e., communication received by device driver 504A from a VM to be sent out over network 55) versus its processing of communication along a receive path (i.e., communication received by device driver 504A from network 55 to be sent to a VM). For example, in many systems the network device driver consumes more CPU in processing "send" path than for the "receive" path. Accordingly, communication monitor 506A may weight the observed communication differently depending at least in part on the directional flow of such communication.

CPU utilization monitor 31 may receive from communication monitor 506A a value corresponding to a weighted amount of communication (e.g., number network packets weighted based on their respective characteristics, such as size and/or directional flow) communicated through virtualized back-end interface $503A_{back}$ between VM $13_2$ and net-IDD 14A, and CPU utilization monitor 31 may also receive a value corresponding to a weighted amount of communication (e.g., number network packets weighted based on their respective characteristics, such as size and/or directional flow) communicated through virtualized back-end interface $503A_{back}$ between VM $13_N$ and net-IDD 14A. Based at least in part on the respective values received for each of VM $13_2$ and $13_N$, CPU utilization monitor 31 may determine a corresponding amount of CPU utilization by the net-IDD 14A that is attributable to each of such VMs $13_2$ and $13_N$. The determined amount of CPU utilization by the net-IDD 14A that is attributable to each of such VMs $13_2$ and $13_N$ may be determined based on monitored usage over a measurement period, which may comprise a plurality of scheduling intervals. Aggregate proportional-share scheduler 12 may then schedule shares of CPU access for future scheduling intervals based on the respective determined usage of each VM during the measurement period.

Communication monitors 506A and/or 506B, CPU utilization monitor 31, and/or aggregate proportional-share scheduler 12 may be software programs stored to a computer-readable medium (e.g., memory, hard disk, optical disc, magnetic disk, or any other data storage device now known or later developed) and executing on a processor-based device, such as a personal computer (PC), laptop computer, server computer, etc. Of course, the functionality of the communication monitors and/or CPU utilization monitor may be implemented in software, hardware, firmware, or any combination thereof. Thus, the communication monitors and/or CPU utilization monitor may be employed as any type of evaluation logic, whether software, hardware, firmware, or any combination thereof.

Figure 6:
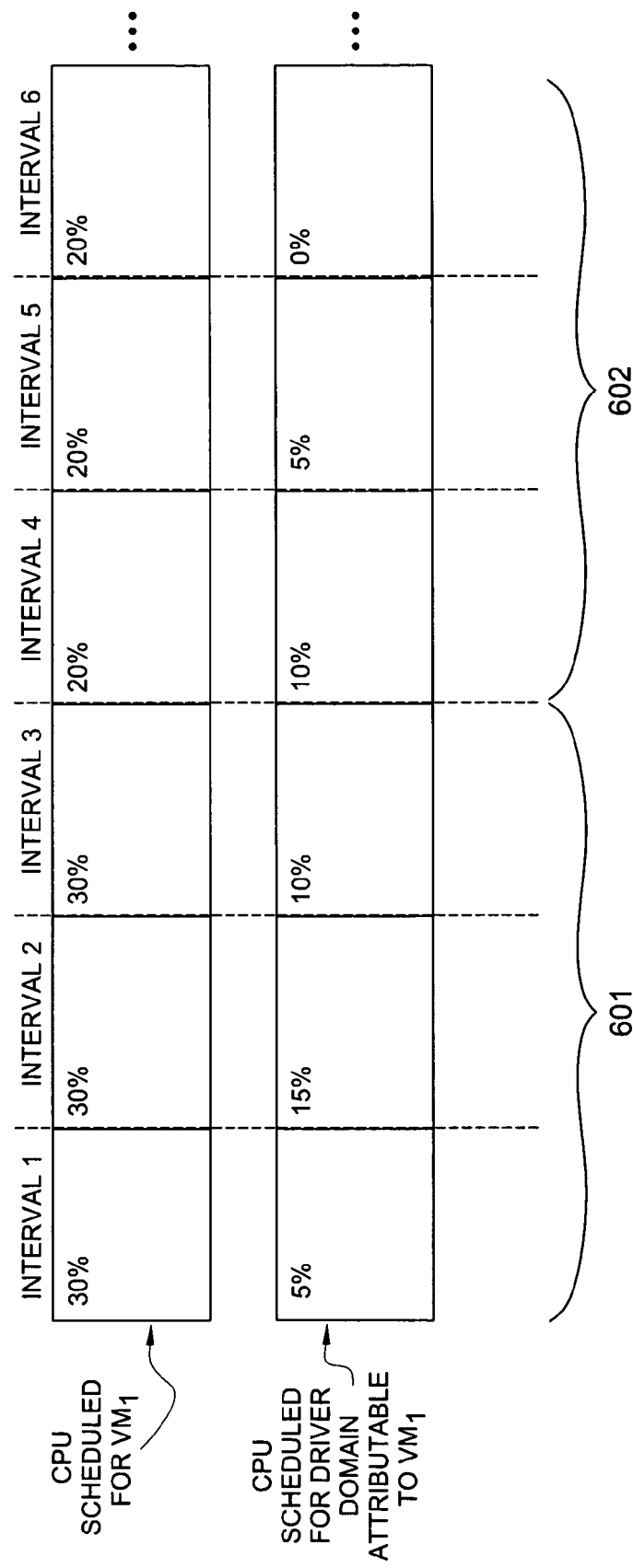
FIG. 6 shows an exemplary scheduling scenario according to one embodiment of the present invention.

FIG. 6 shows an exemplary scheduling scenario according to one embodiment of the present invention. In this example, 6 scheduling intervals, which may be 100 ms each for example, are shown. Further, in this example, measurement periods are 300 ms each. The graph of FIG. 6 shows an amount of the scheduling interval that is allocated by an embodiment of the aggregate proportional-share scheduler 12 to a given VM, $VM_1$. Suppose for this scenario that $VM_1$ is weighted such that its proportional share of each scheduling interval is 30% (i.e., 30 ms). Also shown in the graph of FIG. 6 is an amount of CPU scheduled for a driver domain 14 in each scheduling interval which is attributable to $VM_1$. In the exemplary scenario of FIG. 6, $VM_1$ is allocated a 30% share of each of scheduling intervals 1 through 3. Additionally, during scheduling interval 1 driver domain 14 is allocated a 5% share that is attributable to $VM_1$ (e.g., driver domain 14 uses a 5% share of CPU in interval 1 on behalf of $VM_1$); during scheduling interval 2 driver domain 14 is allocated a 15% share that is attributable to $VM_1$ (e.g., driver domain 14 uses a 15% share of CPU in interval 2 on behalf of $VM_1$); and during scheduling interval 3 driver domain 14 is allocated a 10% share that is attributable to $VM_1$ (e.g., driver domain 14 uses a 10% share of CPU in interval 3 on behalf of $VM_1$).

Thus, during the first measurement period 601, driver domain 14 used a total of 30 ms on behalf of $VM_1$. Such 30 ms may be thought of as a "debt" that is to be repaid by the $VM_1$ to maintain its 30% overall proportion. That is, the 30 ms used by driver domain 14 on behalf of $VM_1$ during the measurement period 601 may be considered an extra "loaned" amount of CPU usage that $VM_1$ is to repay over future scheduling intervals. Accordingly, in this example, aggregate proportional-share scheduler 12 reduces the amount of CPU scheduled for the $VM_1$ over the next 3 scheduling intervals (intervals 4-6) accordingly. In this example, rather than subtracting the full 30 ms amount that was measured as being used by driver domain 14 on behalf of $VM_1$ during the first measurement period 601 entirely in the next scheduling interval (i.e., scheduling interval 4), the 30 ms "debt" accrued by $VM_1$ during the measurement period 601 is distributed across a plurality of future scheduling intervals (i.e., intervals 4-6). For instance, in this example, the 30 ms "debt" is divided evenly across 3 scheduling intervals (because the measurement period 601 comprises 3 scheduling intervals). Thus, 10 ms is subtracted from the 30 ms that $VM_1$ would otherwise receive in each of the next 3 scheduling intervals, intervals 4-6. Therefore, as shown in FIG. 6, $VM_1$ is scheduled 20 ms of CPU access is scheduled for $VM_1$ for each of the next 3 scheduling intervals, intervals 4-6.

Also, in this example, a second measurement period 602 comprises the scheduling intervals 4-6. In this example, during scheduling interval 4 driver domain 14 is allocated a 10% share that is attributable to $VM_1$ (e.g., driver domain 14 uses a 10% share of CPU in interval 4 on behalf of $VM_1$); during scheduling interval 5 driver domain 14 is allocated a 5% share that is attributable to $VM_1$ (e.g., driver domain 14 uses a 5% share of CPU in interval 5 on behalf of $VM_1$); and during scheduling interval 6 driver domain 14 is allocated a 0% share that is attributable to $VM_1$ (e.g., driver domain 14 uses no CPU in interval 6 on behalf of $VM_1$). Thus, during the second measurement period 602, driver domain 14 used a total of 15 ms on behalf of $VM_1$. Accordingly, in this example, aggregate proportional-share scheduler 12 reduces the amount of CPU scheduled for the $VM_1$ over the next 3 scheduling intervals (intervals 7-9) accordingly. In this example, rather than subtracting the full 15 ms amount that was measured as being used by driver domain 14 on behalf of $VM_1$ during the second measurement period 602 entirely in the next scheduling interval (i.e., scheduling interval 7), the 15 ms "debt" accrued by $VM_1$ during the measurement period 602 is distributed across a plurality of future scheduling intervals (i.e., intervals 7-9). For instance, in this example, the 15 ms "debt" is divided evenly across 3 scheduling intervals (because the measurement period 602 comprises 3 scheduling intervals). Thus, 5 ms is subtracted from the 30 ms that $VM_1$ would otherwise receive in each of the next 3 scheduling intervals, intervals 7-9. Therefore, $VM_1$ will be scheduled 25 ms of CPU access is scheduled for each of the next 3 scheduling intervals, intervals 7-9, and so on.

In certain embodiments, the "debt" measured for a given VM over a measurement period may be accounted for over a plurality of future scheduling intervals if the debt exceeds a predetermined threshold. For instance, in measurement period 601 of FIG. 6, the "debt" is 30 ms, which would consume an entire share of CPU access that would otherwise be received by the VM1 in the next scheduling interval 4. Therefore, it may be desirable to distribute this debt over several future scheduling intervals. On the other hand, the "debt" in measurement period 602 of FIG. 6 is only 15 ms, which would consume only half of a share of CPU access that would otherwise be received by the VM1 in the next scheduling interval 7. Therefore, in certain embodiments, such 15 ms may be subtracted entirely from the next scheduling interval (interval 7), rather than distributing the 15 ms across the next 3 scheduling intervals in the manner described above. Of course, any such triggering threshold may be defined (e.g., by a system administrator) for triggering such a distribution of debt across a plurality of future scheduling intervals, or in certain embodiments no such triggering threshold may be defined and all debt incurred in any given measurement period may be distributed across a plurality of future scheduling intervals.

An exemplary embodiment of aggregate proportional-share scheduler 12 which is implemented by modifying the well-known Simple Earliest Deadline First (SEDF) scheduler is now described. The SEDF scheduler provides weighted CPU sharing in an intuitive way and uses real-time algorithms to ensure time guarantees. Such SEDF scheduler may be used for scheduling CPU usage for different VMs (or "domains").

Traditionally, such a proportional-share CPU scheduler is based on a description that specifies a fraction of CPU that should be allocated to different VMs as well as IDDs, i.e. each $VM_i$ and each $IDD_k$ should specify the CPU share that is allocated by a scheduler. Such traditional proportional-share CPU schedulers offer no way to enforce a policy that allocates combined X % CPU share to a particular $VM_i$ over time such that $X=X_i+Y_k^i$ where $X_i$ is CPU usage by $VM_i$ and $Y_k^i$ is CPU usage by $IDD_k$ as a result of I/O processing on behalf of the guest domain $VM_i$. $Y_k^i$ may be referred to as CPU debt of $VM_i$.

Concurrently filed and commonly assigned U.S. patent application Ser. No. 11/493,348, Filed Jul. 26, 2010 titled "SYSTEM AND METHOD FOR CONTROLLING AGGREGATE CPU USAGE BY VIRTUAL MACHINES AND DRIVER DOMAINS" provides exemplary embodiments of an aggregate proportional-share scheduler that is operable to enforce such a policy. According to one embodiment, a modified SEDF scheduler (referred to as SEDF-Debt Collector or "SEDF-DC") measures CPU usage $Y_k^i$ by IDDk on behalf of VMi during time interval Tn, and decreasing CPU allocation to VMi by $Y_k^i$ amount during a next time interval Tn+1.

However, when a scheduler uses a coarser granularity time interval for measurements, it may lead to a bursty CPU allocation for VMs that host network-intensive applications. It might happen that $VM_i$ will receive zero allocation of CPU shares for several consecutive periods until the CPU debt is "repaid" by the $VM_i$. Thus, according to certain embodiments of the present invention, such as the exemplary modified SEDF scheduler described hereafter, an optimized CPU scheduling algorithm is provided that attempts to spread a charge for CPU debt measured at a time interval $T_n$ across all the scheduling intervals in the next time interval $T_{n+1}$. Such an optimized algorithm thus supports more consistent and smooth CPU allocation to VMs with applications that intensively use a driver domain (e.g., network-intensive applications that intensively use a network driver domain).

In briefly describing a modified SEDF scheduler according to one embodiment of the present invention, consider that each domain $Dom_i$ specifies its CPU requirements by a pair $(s_i, p_i)$, where the slice $s_i$ and the period $p_i$ together represent a CPU share that $Dom_i$ requests: $Dom_i$ will receive at least $s_i$ units of time in each period of length $p_i$. The SEDF scheduler maintains 3 queues:

1) $Q_r$—a queue of runnable domains;
2) $Q_w$—a queue of domains that have exhausted their slice and are waiting for the next period; and
3) $Q_b$—a queue of blocked domains.

For each domain $Dom_i$, the scheduler keeps track of two additional values $(d_i, r_i)$:

$d_i$—domain's current deadline for CPU allocation, which is the time at which the current period of domain $Dom_i$ ends; and $r_i$—domain's current remaining time for CPU allocation, which is the CPU time remaining to domain $Dom_i$ within its current period.

SEDF-DC uses a notion of deadlines to pick the domain to be scheduled next. Intuitively, deadline denotes the absolute time by which a domain should have received its specified share of the CPU. Note that this differs from the period because the period only specifies a "window" or interval of time, whereas deadline is a specific point in absolute time.

Both $Q_r$ and $Q_w$ are kept sorted by deadlines, which makes picking the next domain to be scheduled a constant time operation. This does not mean, however, that the scheduler is O(1), since some other work also needs to be done. To begin with, each domain $D_i$'s deadline is set to NOW+$p_i$, where NOW denotes the current, real time.

According to one embodiment, the exemplary SEDF-DC scheduler is operable to allocate combined X % CPU share to a particular $VM_i$ over time such that $X=X_i+Y_k$, where $X_i$ is CPU usage by $VM_i$ and $Y_k$ is CPU usage by $IDD_k$ as a result of I/O processing on behalf of the guest domain $VM_i$. Let f denote a feedback interval (for efficiency reasons, it can be set in a range of 10-100 ms, for example). Further, let net-IDD be a driver domain with a networking device that is shared by $Dom_1, \ldots, Dom_n$. The following algorithm description is simplified (without losing generality) by considering a single driver domain net-IDD.

Using a CPU utilization monitor 31, such as described above, information about CPU usage by net-IDD is collected every f ms interval, and a fraction of CPU time $used_i^{IDD}$ that was used by net-IDD for networking processing on behalf of $Dom_i$ ($1 \leq i \leq n$) during the latest f ms interval is computed. This value is provided to the SEDF-DC scheduler at each f ms interval and is expressed in ms.

For each domain $Dom_i$, the scheduler keeps track of three values $(d_i, r_i, debt_i^{IDD})$, where a) $d_i$—domain's current deadline for CPU allocation, which is the time at which the current period of domain $Dom_i$ ends;

b) $r_i$—domain's current remaining time for CPU allocation, which is the CPU time remaining to domain $Dom_i$ within its current period;

c) $debt_i^{IDD}$—already implicitly consumed CPU time by $Dom_i$ via net-IDD's networking processing performed on behalf of $Dom_i$, which is referred to as CPU debt for $Dom_i$. At each f ms interval, this value is incremented by newly computed $used_i^{IDD}$ for the latest f ms interval, i.e. $debt_i^{IDD}=debt_i^{IDD}+used_i^{IDD}$.

Let a and b be integer numbers, the following function $a \dot{-} b$ is introduced as follows:

$$a \dot{-} b = \begin{cases} 0 & \text{if } a \leq b \\ a-b & \text{otherwise} \end{cases}.$$

Below, a modified procedure is described for how the queues ($Q_r$, $Q_w$, and $Q_b$) are updated on each invocation of the exemplary SEDF-DC scheduler:

1) The time $gotten_i$ for which the current $Dom_i$ has been running is deducted from its value $r_i$, i.e. $r_i=r_i-gotten_i$. If $debt_i^{IDD}>0$, then the SEDF-DC scheduler attempts to charge $Dom_i$ for its CPU debt by decreasing the remaining time of its CPU slice as follows:
  a) if $debt_i^{IDD} \leq r_i$, then $r_i=r_i-debt_i^{IDD}$ and $debt_i^{IDD}=0$; and
  b) if $debt_i^{IDD}<r_i$, then $debt_i^{IDD}=debt_i^{IDD}-r_i$ and $r_i=0$.

2) If a remaining time $r_i$ becomes equal to 0, i.e. $r_i=0$, then $Dom_i$ is moved from $Q_r$ to $Q_w$. This means that $Dom_i$ has received its required CPU time in the current period.

3) For each domain $Dom_k$ in $Q_w$, if $NOW \geq d_k$, then the following updates are performed:
  a) $r_k$ is reset to $s_k \dot{-} debt_i^{IDD}$;
  b) $debt_k^{IDD}$ is decreased by $\min(s_k, debt_k)$;
  c) the new deadline is set to $d_k+p_k$; and
  d) If $r_k>0$, then $Dom_k$ is moved from $Q_w$ to $Q_r$.

4) The next timer interrupt is scheduled for $\min(d_w^h+p_w^h, d_r^h)$, where $d_w^h$, $p_w^h$ and $d_r^h$, $p_r^h$ denote the deadline and period of the domains that are respective heads of $Q_r$ and $Q_w$ queues.

5) On the interrupt, the exemplary SEDF-DC scheduler runs the head of $Q_r$. If $Q_r$ is empty, it selects an element of $Q_w$.

6) When domain $Dom_k$ in $Q_b$ is unblocked, the following updates are taken depending on the conditions:
  a) if $NOW<d_k$, then
    i) if $debt_k^{IDD} \leq r_k$, then $r_k=r_k-debt_k^{IDD}$, and $debt_k^{IDD}=0$, and $Dom_k$ is moved from $Q_b$ to $Q_r$.
    ii) if $debt_k^{IDD}>r_k$, then $debt_k^{IDD}=debt_k^{IDD}-r_k$ and $r_k=0$.
  b) if $NOW \geq d_k$, then SEDF-DC computes for how many periods $Dom_k$ was blocked and charges this unused CPU time against the CPU debt of $Dom_k$ as follows:

$$bl\_periods = int\left(\frac{(NOW-d_k)}{p_k}\right),$$

and $debt_k^{IDD}=debt_k^{IDD}-r_k-bl\_periods \times s_k$.

c) $r_k$ is reset to $s_k$-$debt_k^{IDD}$. If remaining time $r_k$ is positive, i.e. $r_k>0$, then $Dom_k$ is moved from $Q_b$ to $Q_r$.
d) $debt_k^{IDD}$ is decreased by $s_k$, more precisely: $debt_k^{IDD}=debt_k^{IDD}-s_k$.
e) the new deadline is set to $d_k+p_k$, i.e. $d_k=d_k+p_k$.

The above exemplary implementation of SEDF-DC might result in a bursty CPU allocation to VMs (the domains) that host network-intensive applications, especially when a coarser granularity time interval f is used for scheduler feedback. It might happen, for example, that domain $Dom_i$ will get zero allocation of CPU shares for several consecutive periods $p_i$ until the CPU debt time $debt_i^{IDD}$ (this is the time that was consumed by net-IDD on behalf of $Dom_i$ during the last interval f) is "repaid" back by domain $Dom_i$ in order to provide the correct combined CPU allocation across net-IDD and $Dom_i$.

Thus, according to one embodiment of the present invention, an optimized SEDF-DC algorithm (referred to herein as "opt-SEDF-DC") is provided that attempts to spread a "charge" for CPU debt across multiple execution periods, and in such a way supports more consistent and smooth CPU allocation to domains with network-intensive applications. Such a opt-SEDF-DC embodiment is now further described. First, we compute how many time periods $p_i$ "fit" within f ms feedback interval. The intent of this exemplary embodiment is to spread the CPU debt of $Dom_i$ across the sequence of periods $p_i$ that happen during f ms feedback interval. This may be referred to as the CPU period frequency of domain $Dom_i$ and is denoted as $period\_freq_i$, which may be computed in the following way:

$$period\_freq_i = int\left(\frac{f}{p_i}\right).$$

If $period\_freq_i>1$, then the scheduler can "spread" $debt_k^{IDD}$ across $period\_freq_i$ number of periods, where at each period $p_i$ domain $Dom_i$ is charged for a fraction of its overall CPU "debt" that is computed according to the following formula:

$$spread\_debt_i = int\left(\frac{debt_i^{IDD}}{period\_freq_i}\right).$$

Clearly, if $spread\_debt_i \geq s_i$, then SEDF-DC and opt-SEDF-DC have the same outcome in this example: domain $Dom_i$ accumulated such a high amount of CPU debt that all the slices during the next f ms are used to "repay" this debt. However, this may occur rarely, because otherwise the application in $Dom_i$ can suffer from starvation, since it does not have access to CPU, and such situations are indicative of an incorrect resource allocation to $Dom_i$.

In the exemplary opt-SEDF-DC algorithm, the items (1), (3), and (6) of the SEDF-DC algorithm described above are modified in the following way:

1. The time $gotten_i$ for which the current $Dom_i$ has been running is deducted from its value $r_i$, i.e. $r_i=r_i-gotten_i$. If $debt_i^{IDD}>0$, then the scheduler attempts to charge $Dom_i$ for its CPU debt by decreasing the remaining time of its CPU slice as follows:
    a) if $spread\_debt_i \leq r_i$, then $r_i=r_i-spread\_debt_i$ and $debt_i^{IDD}=debt_i^{IDD}-spread\_debt_i$; and
    b) if $spread\_debt_i>r_i$, then $debt_i^{IDD}=debt_i^{IDD}-r_i$ and $r_i=0$.

3. For each domain $Dom_k$ in $Q_w$, if $NOW \geq d_k$ and $debt_i^{IDD}<0$, then the following updates are performed:
    a) $r_k$ is reset to $s_k$-$spread\_debt_k$;
    b) $debt_k^{IDD}$ is decreased by $min(s_k, spread\_debt_k)$;
    c) the new deadline is set to $d_k+p_k$, i.e. $d_k=d_k+p_k$; and
    d) If $r_k>0$, then $Dom_k$ is moved from $Q_w$ to $Q_r$.

6. When domain $Dom_k$ in $Q_b$ is unblocked and $debt_k^{IDD}>0$, the following updates are taken depending on the conditions:
    a) if $NOW<d_k$ then
        i) if $spread\_debt_i \leq r_i$, then $r_i=r_i-spread\_debt_i$, and $debt_i^{IDD}=debt_i^{IDD}-spread\_debt_i$, and $Dom_k$ is moved from $Q_b$ to $Q_r$; and
        ii) if $spread\_debt_i>r_i$, then $debt_i^{IDD}=debt_i^{IDD}-r_i$ and $r_i=0$.
    b) if $NOW>d_k$ then
        i) the scheduler computes for how many periods $Dom_k$ was blocked and charges this unused CPU time against the CPU debt of $Dom_k$ as follows:

$$bl\_periods = int\left(\frac{(NOW-d_k)}{p_k}\right),$$

and $debt_k^{IDD}=debt_k^{IDD}-r_k-bl\_periods \times s_k$.
        ii) $r_k$ is reset to $s_k$-$min(spread\_debt_k, debt_k^{IDD})$. If remaining time $r_k$ is positive, i.e. $r_k>0$, then $Dom_k$ is moved from $Q_b$ to $Q_r$;
        iii) $debt_k^{IDD}$ is decreased by $min(s_k, spread\_debt_k, debt_k^{IDD})$; and
        iv) the new deadline is set to $d_k+p_k$.

The above provides an exemplary embodiment of a modified SEDF scheduler, referred to as opt-SEDF-DC, which is operable to spread the debt of CPU usage by a driver domain on behalf of a given VM across a plurality of future scheduling intervals for the given VM.

As mentioned above, traditional proportional-share CPU schedulers are based on a description that specifies a fraction of CPU that should be allocated to different VMs as well as IDDs, i.e. each $VM_i$ and each $IDD_k$ should specify the CPU share that is allocated by a scheduler. Such traditional schedulers provide no way to enforce a policy that allocates combined X % CPU share to a particular $VM_i$ over time such that $X=X_i+Y_k$ where $X_i$ is CPU usage by $VM_i$ and $Y_k$ is CPU usage by $IDD_k$ as a result of I/O processing on behalf of the guest domain $VM_i$.

Certain embodiments of the present invention introduce this new policy and exemplary embodiments of a CPU scheduler for supporting it. However, there may be constraints on initial parameters for CPU allocation to net-IDD and $Dom_i$ in order for the above-described opt-SEDF-DC algorithm to work appropriately. For example, let us denote initially specified CPU allocation of net-IDD as $A^{IDD}$ and initially specified CPU allocation of $Dom_i$ as $A_i$. First of all, net-IDD should be allocated a smaller CPU share than $Dom_i$, i.e. $A^{IDD} \leq A_i$. Otherwise, combined CPU usage of $Dom_i$ can be $A^{IDD}$, because net-IDD can consume $A^{IDD}$ of CPU amount on behalf of $Dom_i$. When net-IDD is allocated a larger CPU share than $Dom_i$, i.e. $A^{IDD}>A_i$, this exemplary opt-SEDF-DC algorithm only guarantees that combined CPU usage of $Dom_i$ can be less or equal to $A^{IDD}$.

Let net-IDD be allocated a smaller CPU share than $Dom_i$, i.e. $A^{IDD} \leq A_i$. It may be desirable to understand the QoS guarantees on CPU usage provided by the exemplary opt-SEDF-DC scheduler described above. In fact, as for QoS guarantees, basic principles of the above-described SEDF- DC and opt-SEDF-DC algorithms are similar. Both of these algorithms are based on measuring CPU usage $Y_k^i$ by $IDD_k$ on behalf of $VM_i$ during time interval $T_n$, and decreasing CPU allocation to $VM_i$ by $Y_k^i$ amount during the next time interval $T_{n+1}$.

A difference of the exemplary opt-SEDF-DC compared to SEDF-DC algorithm is that this exemplary opt-SEDF-DC algorithm spreads a "charge" for CPU debt measured at time interval $T_n$ across all the periods in the next time interval $T_{n+1}$ and in such a way supports more consistent and smooth CPU allocation to domains with network-intensive applications. Let us consider a sequence of time intervals $T_1, T_2, \ldots, T_N$ each of duration f ms that represent the duration of algorithm feedback loop in the above-described opt-SEDF-DC. Let $CPU_i(T_k)$ denote CPU usage by $Dom_i$ during time interval $T_k$. Similarly, let $CPU^{IDD}(T_k)$ denote CPU usage by net-IDD on behalf of $Dom_i$ during time interval $T_k$. And, let us denote $combCPU_i(T_k) = CPU_i(T_k) + CPU^{IDD}(T_k)$. During the first time interval $T_1$ the combined CPU usage by $Dom_i$ is $CPU_i(T_1) + CPU^{IDD}(T_1)$.

It should be noted that $CPU^{IDD}(T_{k-1})$ represents a CPU debt of $Dom_i$ that is "claimed" against its CPU allocation in the next time interval $T_k$. During the first time interval, $CPU^{IDD}(T_{k-1})$ is charged against $Dom_i$ CPU usage and it is guaranteed by the scheduler that $CPU_i(T_2) \leq A_i - CPU^{IDD}(T_1)$. Hence, it is guaranteed that $CPU_i(T_k) + CPU^{IDD}(T_{k-1}) \leq A_i$.

Let us now consider time interval $T = (T_1, T_N)$ and compute a combined CPU usage by $Dom_i$ across T:

$$combCPU_i(T) = \frac{\sum_{1 \leq k \leq N}(CPU_i(T_k) + CPU^{IDD}(T_k))}{N}.$$

The above equation can be rewritten in a slightly different way as follows:

$$combCPU_i(T) = \frac{CPU_i(T_1) + CPU^{IDD}(T_N) + \sum_{1 \leq k \leq N-1}(CPU_i(T_{k+1}) + CPU^{IDD}(T_k))}{N}.$$

Since for any k such that $1 < k < N-1$ the following holds: $CPU_i(T_{k+1}) + CPU^{IDD}(T_k) \leq A_i$. It can be recognized that over time: $combCPU_i(T) \leq A_i$, and therefore the above-described opt-SEDF-DC scheduler supports promised QoS guarantees.

It should be recognized that while an exemplary opt-SEDF-DC scheduler is described above, embodiments of the present invention are not limited to adapting the SEDF scheduler, but may likewise be employed for any weighted proportional-share scheduler now known or later developed. The exemplary aggregate proportional-share scheduler 12 described herein, when implemented via computer-executable instructions, is in essence the software code defining the operations thereof. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information. In certain embodiments, a CPU may execute the various logical instructions according to embodiments of the present invention. For example, a CPU may execute machine-level instructions according to the exemplary operational flows described above in conjunction with FIGS. 2A-2B.

It shall be appreciated that the present invention is not limited to the architecture of the system on embodiments thereof may be implemented. For example, any suitable processor-based device may be utilized for implementing the above-described operations, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method comprising:
    determining an amount of central processing unit (CPU) usage by a driver domain on behalf of a given virtual machine (VM) over a measurement period;
    determining a share of CPU access to schedule for the given VM for a plurality of future scheduling intervals based at least in part on the determined amount of CPU usage by the driver domain on behalf of the given VM over the measurement period by reducing an amount of CPU access that would otherwise be scheduled for the given VM in each of the plurality of future scheduling intervals by a fraction of the determined amount of CPU usage by the driver domain on behalf of the given VM; and
    scheduling the determined share of CPU access to the given VM for the plurality of future scheduling intervals.

2. The method of claim 1 wherein the scheduling comprises: scheduling by an aggregate proportional-share scheduler.

3. The method of claim 1 wherein the measurement period comprises a plurality of scheduling intervals.

4. The method of claim 1 wherein the fraction comprises a quotient of the determined amount of CPU usage by the driver domain on behalf of the given VM divided by a number of scheduling intervals included in the measurement period.

5. The method of claim 4 wherein the plurality of future scheduling intervals comprise the number of scheduling intervals included in the measurement period.

6. The method of claim 1 wherein the measurement period comprises X number of CPU scheduling intervals, wherein X is one or more, the method comprising:
    dividing the determined amount of CPU usage by the driver domain on behalf of the given VM during the measurement period by the X number of scheduling intervals in the measurement period to result in a quotient Q;
    subtracting the quotient Q from an amount of CPU access that would otherwise be scheduled for the given VM in each of X number of future scheduling intervals to result in a share S of CPU access to be scheduled for the given VM for each of the X number of future scheduling intervals; and
    scheduling the determined share S of CPU access to the given VM for each of the X number of future scheduling intervals.

7. The method of claim 1 wherein said scheduling comprises: scheduling CPU access in a manner that provides aggregate use of CPU by the given VM in proportion to a relative weight assigned to the given VM.

8. A system comprising:
  at least one central processing unit (CPU);
  a plurality of virtual machines (VMs);
  at least one driver domain that comprises a device driver for use by the VMs for accessing a shared resource; and
  an aggregate proportional-share CPU scheduler that schedules access to the at least one CPU for the plurality of VMs such that their aggregate CPU access is in proportion to respective weights assigned to the VMs, wherein an amount of CPU access scheduled for a given one of the VMs for each of a plurality of scheduling intervals is based at least in part on an amount of CPU usage by the at least one driver domain on behalf of the given one of the VMs during an earlier measurement period, wherein an amount of CPU access that would otherwise be scheduled for the given one of the VMs in each of the plurality of scheduling intervals is reduced by a fraction of the amount of CPU usage by the at least one driver domain on behalf of the given one of the VMs.

9. The system of claim 8 further comprising:
  a CPU utilization monitor operable to determine an aggregate CPU access for each of the VMs, wherein each of the VMs aggregate CPU access comprises an aggregate of the VM's CPU access and CPU access by the at least one driver domain that is attributable to the VM.

10. The system of claim 9 wherein the CPU utilization monitor determines the aggregate CPU access for each of the VMs over the measurement period.

11. The system of claim 8 wherein the earlier measurement period comprises a plurality of scheduling intervals.

12. The system of claim 8 wherein the at least one driver domain comprises an isolated driver domain in which a device driver for network communication resides.

13. The system of claim 8 wherein the shared resource comprises a communication network.

14. The system of claim 8 wherein the aggregate proportional-share scheduler comprises a modified Simple Earliest Deadline First (SEDF) scheduler.

15. The system of claim 8 wherein the measurement period comprises X number of CPU scheduling intervals, wherein X is one or more, and wherein the amount of CPU access scheduled for a given one of the VMs for each of a plurality of scheduling intervals is determined by
  a) dividing the amount of CPU usage by the at least one driver domain on behalf of the given one of the VMs during the earlier measurement period by the X number of scheduling intervals in the earlier measurement period to result in a quotient Q, and
  b) subtracting the quotient Q from an amount of CPU access that would otherwise be scheduled for the given one of the VMs in each of X number of future scheduling intervals to result in a share S of CPU access to be scheduled for the given one of the VMs for each of the X number of future scheduling intervals.

16. Computer-executable software code stored to a non-transitory computer-readable medium, the computer-executable software code comprising executable routines to:
  determine a share of central processing unit (CPU) access to schedule for a given VM for each of a plurality of future scheduling intervals based at least in part on a determined amount of CPU usage by a driver domain on behalf of the given VM over an earlier measurement period, so that an amount of CPU access that would otherwise be scheduled for the given VM in each of the plurality of future scheduling intervals is reduced by a fraction of the determined amount of CPU usage by the driver domain on behalf of the given VM; and
  schedule the determined share of CPU access to the given VM for each of the plurality of future scheduling intervals.

17. The computer-executable software code of claim 16 wherein the measurement period comprises X number of CPU scheduling intervals, wherein X is one or more, and the computer-executable software code comprises executable routines to:
  divide the determined amount of CPU usage by the driver domain on behalf of the given VM during the measurement period by the X number of scheduling intervals in the measurement period to result in a quotient Q; and
  subtract the quotient Q from an amount of CPU access that would otherwise be scheduled for the given VM in each of X number of future scheduling intervals to result in a share S of CPU access to be scheduled for the given VM for each of the X number of future scheduling intervals.

18. The computer-executable software code of claim 17 wherein the executable routine to schedule the determined share of CPU access comprises:
  an executable routine to schedule the determined share S of CPU access to the given VM for each of the X number of future scheduling intervals.

19. The computer-executable software code of claim 16 wherein the earlier measurement period comprises a plurality of CPU scheduling intervals.

* * * * *